(12) United States Patent
Marshall

(10) Patent No.: US 6,276,738 B1
(45) Date of Patent: Aug. 21, 2001

(54) RETRACTABLE TAILGATE ASSEMBLY

(75) Inventor: Robert L. Marshall, Salem, KY (US)

(73) Assignee: Bob Marshall Enterprises, Inc., Salem, KY (US)

( * ) Notice: Subject to any disclaimer, the term of this patent is extended or adjusted under 35 U.S.C. 154(b) by 0 days.

(21) Appl. No.: 09/556,282

(22) Filed: Apr. 24, 2000

Related U.S. Application Data

(60) Provisional application No. 60/130,791, filed on Apr. 23, 1999.

(51) Int. Cl.[7] ............................. B60P 1/26; B62D 33/03; B62D 33/037
(52) U.S. Cl. ......................... 296/57.1; 296/50; 296/37.6; 296/51
(58) Field of Search ............................. 296/50, 51, 57.1, 296/58, 37.6

(56) References Cited

U.S. PATENT DOCUMENTS

| | | | |
|---|---|---|---|
| 2,431,588 | * 11/1947 | Sharpe | 296/50 |
| 2,852,303 | 9/1958 | Hopson. | |
| 2,872,239 | 2/1959 | Bowness et al. . | |
| 3,004,790 | 10/1961 | Mayer . | |
| 3,010,760 | 11/1961 | Trautmann . | |
| 3,695,666 | * 10/1972 | Corson | 296/57.1 |
| 4,580,828 | 4/1986 | Jones . | |
| 4,813,842 | 3/1989 | Morton . | |
| 4,856,840 | 8/1989 | Hanley . | |
| 4,951,991 | 8/1990 | Haigler . | |
| 5,104,172 | * 4/1992 | Schildt | 296/50 |
| 5,123,692 | 6/1992 | Couvillion . | |
| 5,451,089 | * 9/1995 | Bender | 296/57.1 |
| 5,456,511 | 10/1995 | Webber . | |
| 5,518,287 | 5/1996 | Totani . | |
| 5,522,685 | * 6/1996 | Lessard | 410/121 |
| 5,954,383 | * 9/1999 | Beck et al. | 296/50 |

* cited by examiner

Primary Examiner—Joseph D. Pape
Assistant Examiner—Greg Blankenship
(74) Attorney, Agent, or Firm—Carrithers Law Office; David W. Carrithers

(57) ABSTRACT

A retractable tailgate assembly includes a release mechanism embedded within a conventional pickup truck tailgate and a support frame attached to the underside of the bed for slidably retracting and holding the tailgate inbetween the pickup truck bed and the frame. The retractable tailgate assembly can be incorporated into new pickup trucks or adapted to existing vehicles. The retractable tailgate does not extend beyond the bed of the truck a distance greater than a traditional original equipment manufacturer's tailgate and utilizes the conventional lock and pivot points of the pickup truck tailgate. Other than being retractable the present invention generally looks and performs as a conventional tailgate so that it can be sat upon, support a load, and be used in the conventional manner; however, the lowering and retraction of the tailgate permits use of the vehicle with a gooseneck trailer attached to the fifth wheel of the pickup without the tailgate extending outwardly or upwardly interfering with the turning radius or being damaged by the gooseneck trailer extension.

25 Claims, 7 Drawing Sheets

RETRACTABLE TAILGATE ASSEMBLY

This application claim priority from United States Provisional Application Ser. No. 60/130,791 filed on Apr. 23, 1999, and is hereby incorporated by reference.

BACKGROUND OF THE INVENTION

1. Field of the Invention

This invention relates generally to retractable tailgate for use on pickup trucks.

2. Description of the Prior Art

Pickup trucks typically have an upwardly open rectangular cargo space rearward of the cab portion of the truck. The cargo space is generally defined by a front end wall panel connecting two spaced apart opposing sidewall panels all of which extend vertically upwardly from a floor or "bed" of the truck. A tailgate defines a rear wall panel pivotally mounted to the end of the sidewall panels near the floor. These panels are typically double thickness providing an interior surface for holding cargo spaced apart from the exterior surface of the vehicle forming a double layer cargo area.

The tailgate usually has two basic positions. The vertical "up" position for forming a cargo box, and the horizontal "down" position whereby the tailgate is usually coplanar with the floor, lowered beneath the floor to rest on the bumper, or raised up at an acute angle with respect to the bed and supported by a holding means. Of course, in some vehicle models the tailgate is removable.

The tailgate is usually held in the vertical "up" position by a latch mechanism such as a chain or peg in cooperative engagement with alignable loops attached to the sidewall panels and tailgate or by a pair of longitudinal members on each side of the tailgate wherein a selected distal end is connected to the sidewall panel and one end is connected to the tailgate. The longitudinal members usually are joined in the center by a rivet allowing the folding of the members for nesting within the tailgate.

Although the tailgate usually remains in the up position, there are times when the user finds it advantageous to lower the tailgate such as when pulling or backing a trailer. For instance, gooseneck trailers designed for hauling heavy equipment and/or livestock have been designed for coupling to a fifth wheel attachment of a truck frame or pickup truck bed whereby a coupling post extends downward from the trailer frame providing rotational support for pulling the trailer. The length of the horizontal frame provides sufficient space between the towing vehicle for pivoting movement of the towing vehicle relative to the trailer; however, depending upon the height of the coupling post, the trailer tongue extending backward from the coupling post may hit and damage the tailgate of the truck in some positions, such as the vertical erect position. A conventional tailgate which is lowered to a general horizontal plane also interferes with the ability to turn a gooseneck or other type trailer due to its rearward protrusion. Hanging the tailgate on the bumper forming an inclined plane angled toward the ground does not eliminate the restriction in the turning radius of the trailer in that the corners of the tailgate may still contact the gooseneck or body of the trailer and cause damage to the tailgate as well.

Another situation where the tailgate interferes with the use of the vehicle is where the user is backing the pickup truck into close adjacency to a loading dock and the user's vision is obscured or when the user is hooking up to a conventional ball hitch trailer wherein the hitchball is located on the bumper below the level of the truck bed and tailgate.

Accordingly it is an object of the present invention to provide a tailgate which functions in the same manner as original equipment, yet provides a method of retracting the tailgate.

It is another object of the present invention to provide a tailgate for a pickup truck having the ability to be positioned in a manner to cause the rear of the cargo compartment to be open, without extending rearwardly or downwardly with respect to the cargo compartment.

It is another object of the present invention to provide a means of attachment to the underside of the bed of a truck rather than the frame.

It is another object of the present invention to provide a tailgate retraction assembly wherein the vertical portion attaching to the tailgate and holding the release and locking mechanism can be nested inbetween the panels of a conventional tailgate.

It is an object of the present invention to provide a retractable tailgate that slides beneath the pickup truck bed and is extensible for interlocking with conventional pivot points on the pickup truck for pivoting and locking in an upright position.

These objects and other objects and advantages of the invention will be apparent from the following description.

SUMMARY OF THE INVENTION

The present invention defines a retractable tailgate assembly includes a release mechanism embedded within a conventional pickup truck tailgate and a support frame for slidably retracting and holding the tailgate inbetween the pickup truck bed and the frame. The retractable tailgate assembly can be incorporated into new pickup trucks or adapted to existing vehicles. The retractable tailgate does not extend beyond the bed of the truck a distance greater than a traditional original equipment manufacturer's, ("OEM")'s, tailgate and utilizes the conventional lock and pivot points of the OEM pickup truck tailgate. Other than being retractable the present invention generally looks and performs as a conventional OEM tailgate so that it can be sat upon and used in the conventional manner; however, the lowering and retraction of the tailgate permits use of the vehicle with a gooseneck trailer attached to the fifth wheel of the pickup without the tailgate interfering with the turning radius or being damaged by the gooseneck trailer extension.

The retractable tailgate assembly defines a tailgate support frame mounting to the bottom of a cargo bed, including longitudinal support members and slidable support members attached to a tailgate and release mechanism for disengaging the tailgate pivot pins from a pin receiving recess in the cargo bed.

More particularly, the present invention is a retractable tailgate assembly for use with a vehicle cargo bed including a floor, a front wall panel connecting a pair of side walls panels, and including a pivoting tailgate defining ends pivotally engaging said pair of side wall panels and means for releasably holding said tailgate in position. A pair of longitudinal side support members attach to a bottom surface of the cargo bed and include a channel formed therein. At least one tubular member is attached to the bottom surface of the cargo bed and at least one slidable longitudinal member cooperatively engages the tubular member. A support member extends normal to the distal end of the slidable longitudinal member. A retractable holding means is supported within the support member for cooperatively engaging the pair of longitudinal side support members and includes distal ends for sliding within the channel. Means for biasing such as spring loaded pins are used to engage the retractable holding means or pins in an extended locked position. Also included are means for releasing the retractable holding means such as a handle and latch mechanism utilizing cables or levers to engage and disengage the pins.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
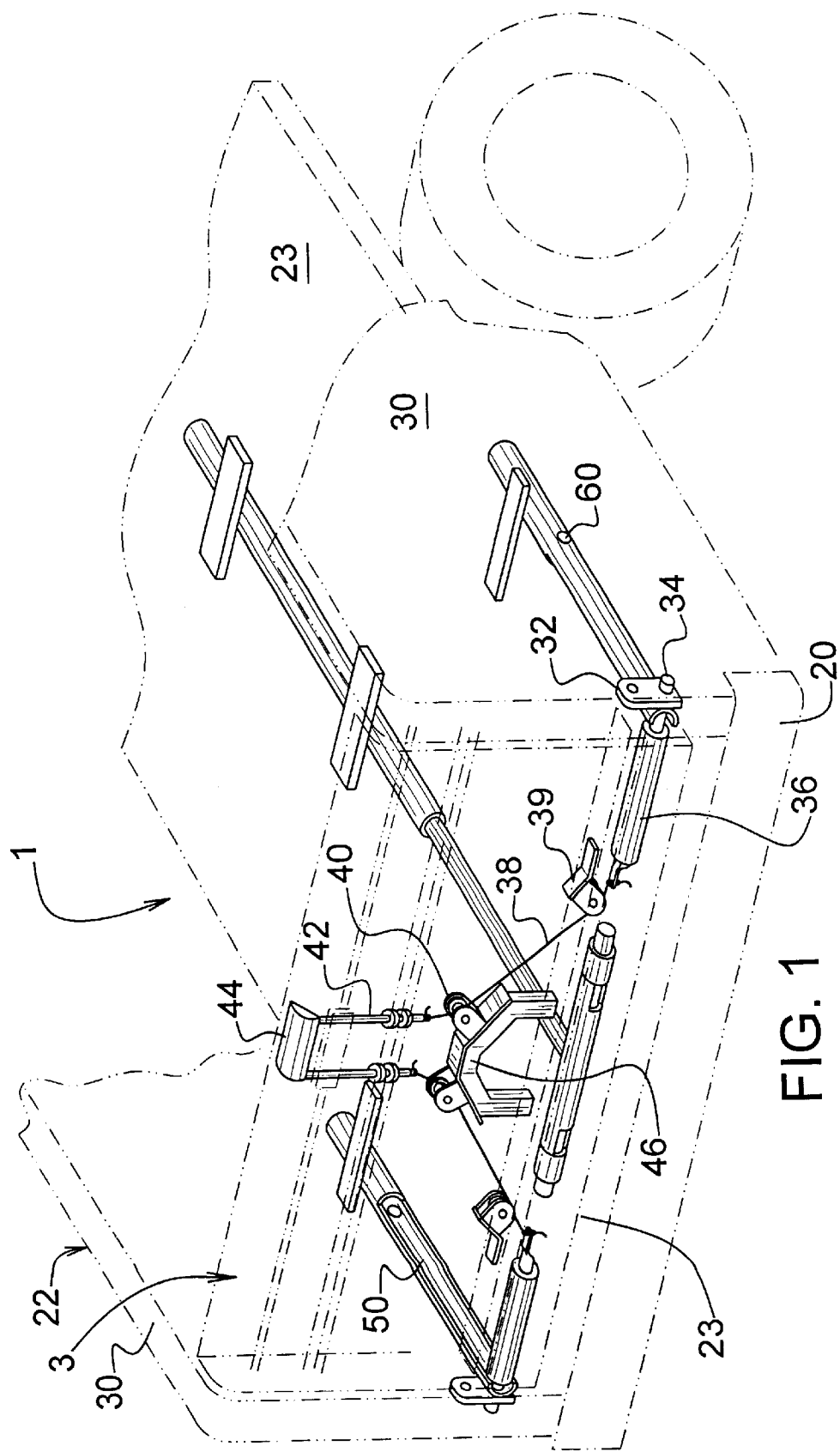
FIG. 1 is a rear perspective view of the present invention showing the retractable tailgate assembly with the tailgate in the raised vertical position and the frame and body of the pickup truck is shown in phantom lines.
Figure 3:
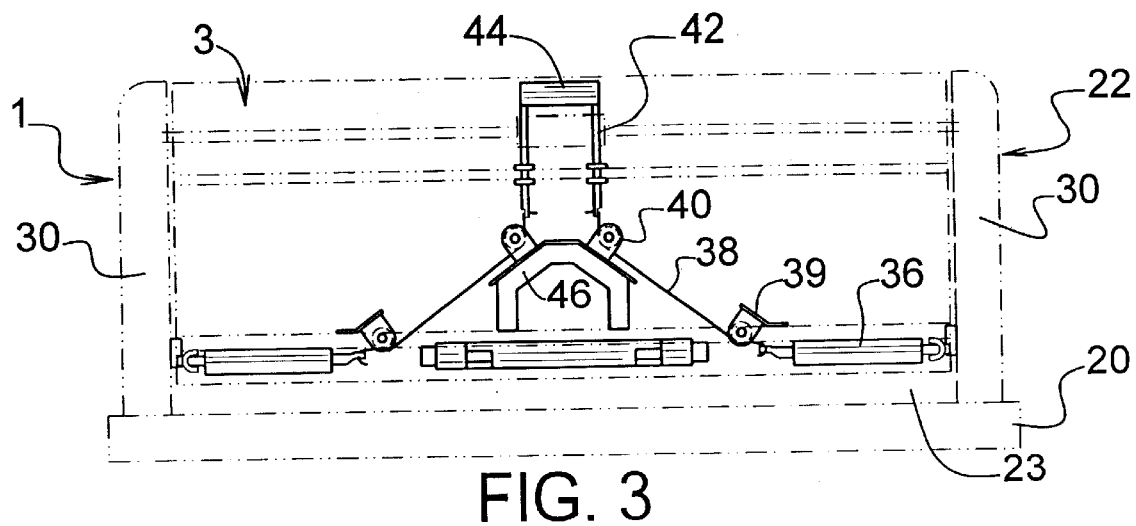
FIG. 3 is an elevational rear view of the pickup truck showing the retractable tailgate assembly of FIG. 1 in the raised position and showing the truck frame and body in phantom lines.

As best shown in FIGS. 1–5, a preferred embodiment of the retractable tailgate assembly 1 includes a tailgate 3 and frame support comprising a single tubular member 10 centrally disposed and attached to the underside of the cargo bed of the pickup truck by attachment members 12. The cargo bed 22 includes a floor 23 connecting sidewalls 30, and a front wall panel (not shown), connecting to a pair of side walls panels 30. The cargo bed 22 is shown together with a bumper 20 in phantom lines in FIGS. 1–11. The tubular member 10 of the preferred embodiment is cylindrical, however it is contemplated that members having square, rectangular or even "I-shaped" cross-sectional shapes could be utilized as long as the member 10 is slidably secured within the assembly. The attachment members 12 comprise strips of metal or polymer welded or attached to the cargo bed frame by bolts.

It should be noted that the preferred embodiment of the present invention is attached to the bottom or underside of the pickup truck cargo bed and not to the frame or channel rails of the truck. Of course, it is contemplated that the present invention could be adapted to fit to a truck frame.

Figure 2:
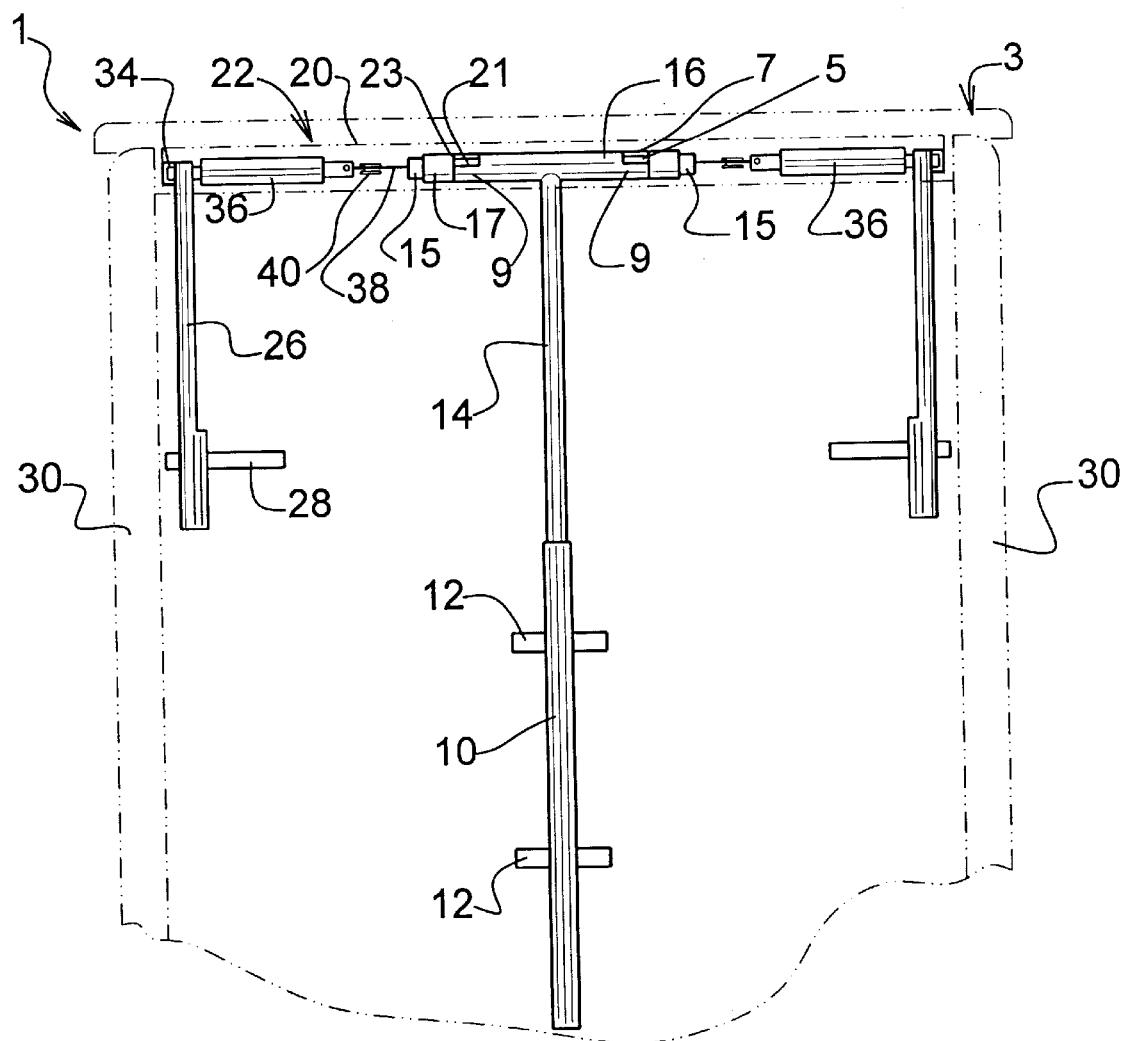
FIG. 2 is a bottom view of the of the pickup truck bed of the retractable tailgate assembly of FIG. 1 showing the tailgate in the raised vertical position and the truck frame and body in phantom lines.
Figure 4:
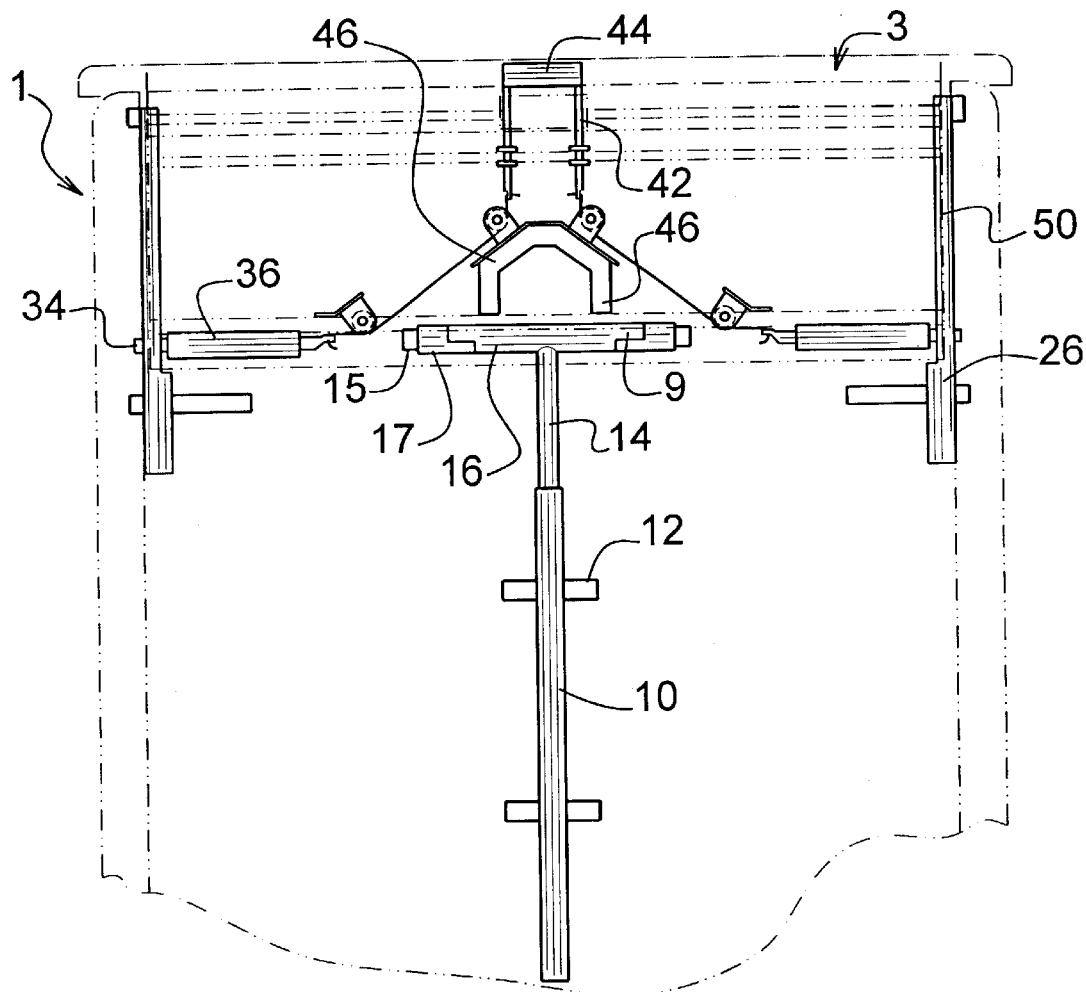
FIG. 4 is a bottom view of the pickup truck bed of the retractable tailgate assembly of FIG. 1 showing the tailgate in the lowered horizontal position and the truck frame and body in phantom lines.
Figure 5:
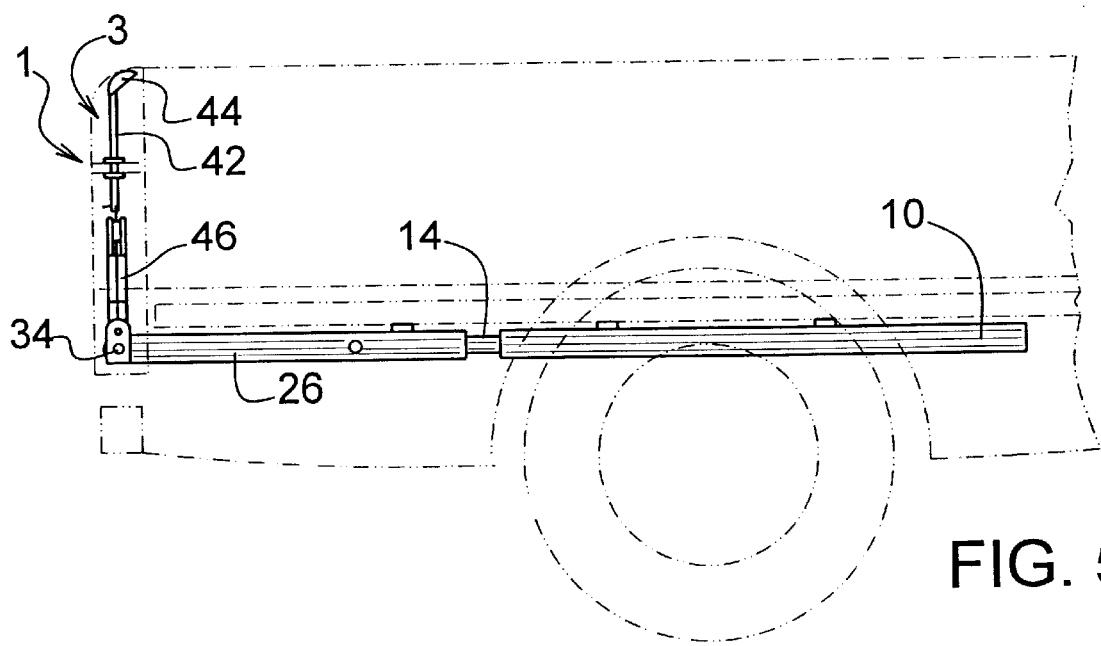
FIG. 5 is a side view of the pickup truck showing the retractable tailgate assembly of FIG. 1 in the raised vertical position and showing the truck frame and body in phantom lines.
Figure 6:
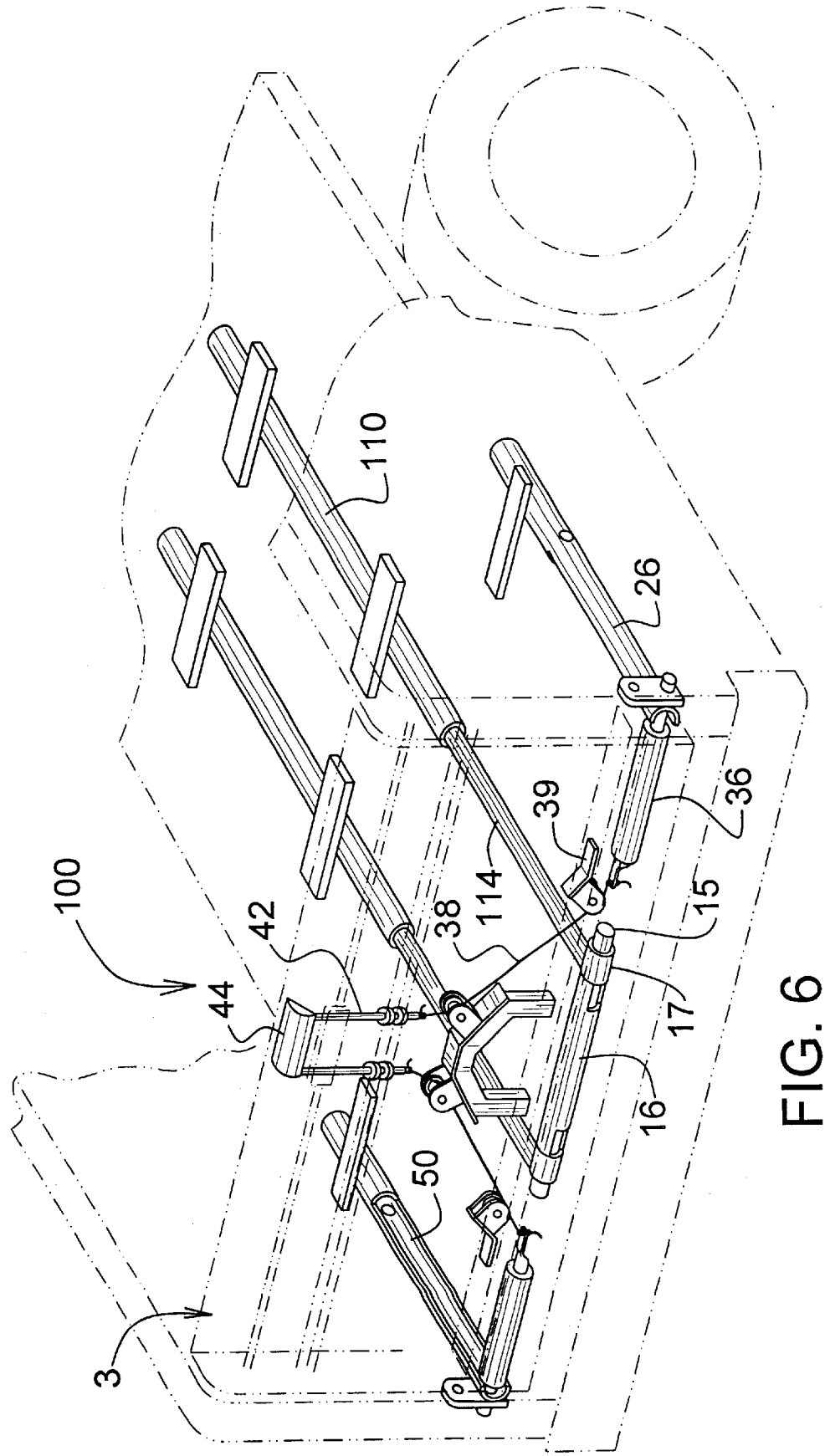
FIG. 6 is an alternate embodiment of the present invention utilizing a retractable tailgate assembly having a pair of tubular members and a pair of corresponding slidable longitudinal members showing a rear perspective view of the present invention with the retractable tailgate assembly and the tailgate in the raised vertical position and the frame and body of the pickup truck is shown in phantom lines.
Figure 7:
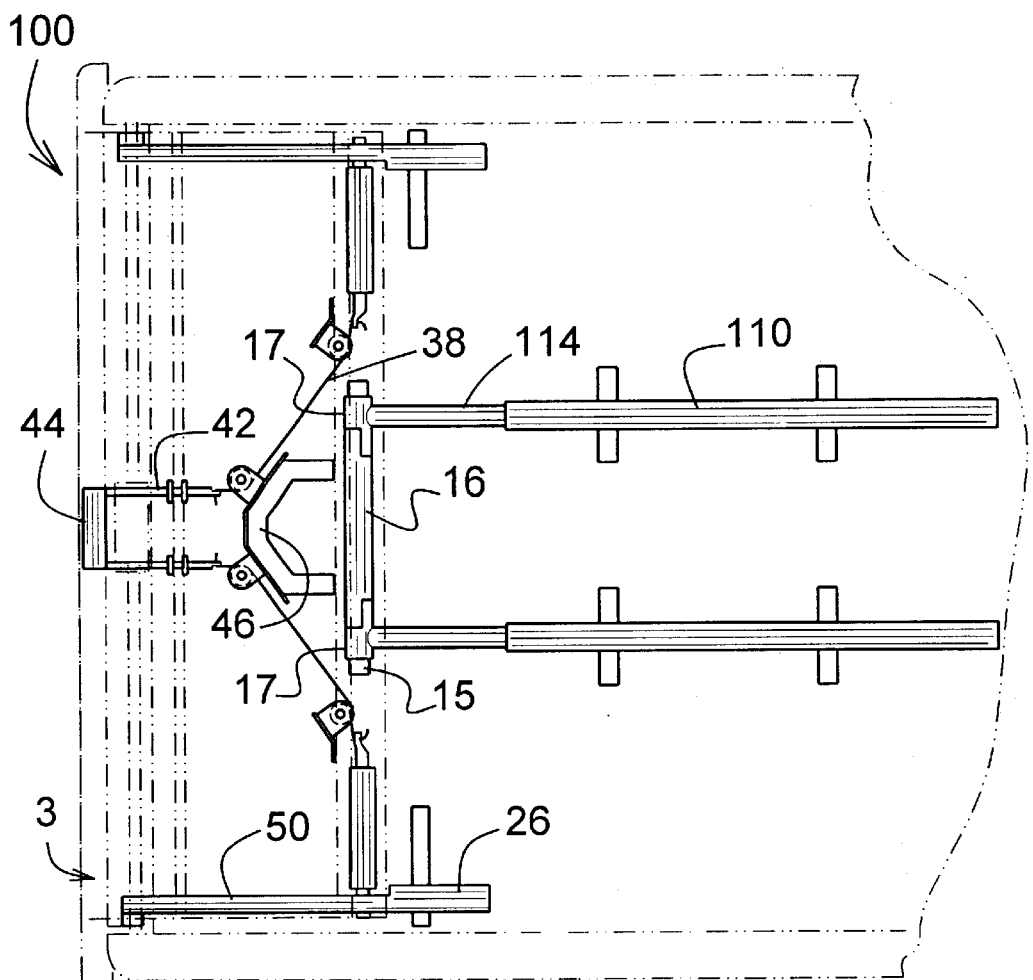
FIG. 7 is a bottom view of the pickup truck bed of the retractable tailgate assembly of FIG. 6 showing the tailgate in the lowered horizontal position and the truck frame and body in phantom lines.
Figure 8:
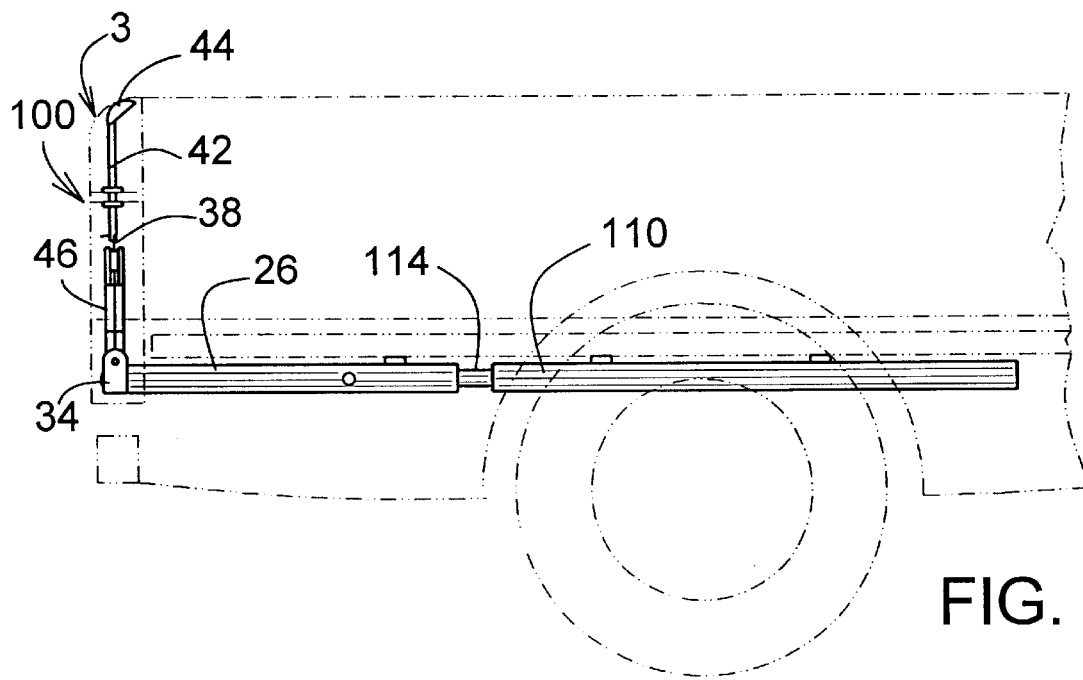
FIG. 8 is a side view of the pickup truck showing the retractable tailgate assembly of FIG. 6 in the raised vertical position and showing the truck frame and body in phantom lines.
Figure 9:
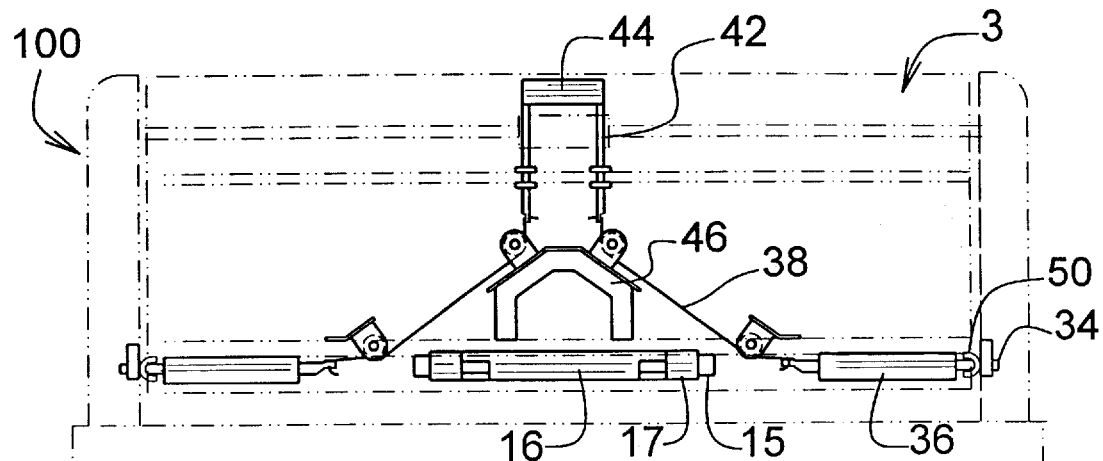
FIG. 9 is an elevational rear view of the pickup truck showing the retractable tailgate assembly of FIG. 6 in the raised position and showing the truck frame and body in phantom lines.
Figure 10:
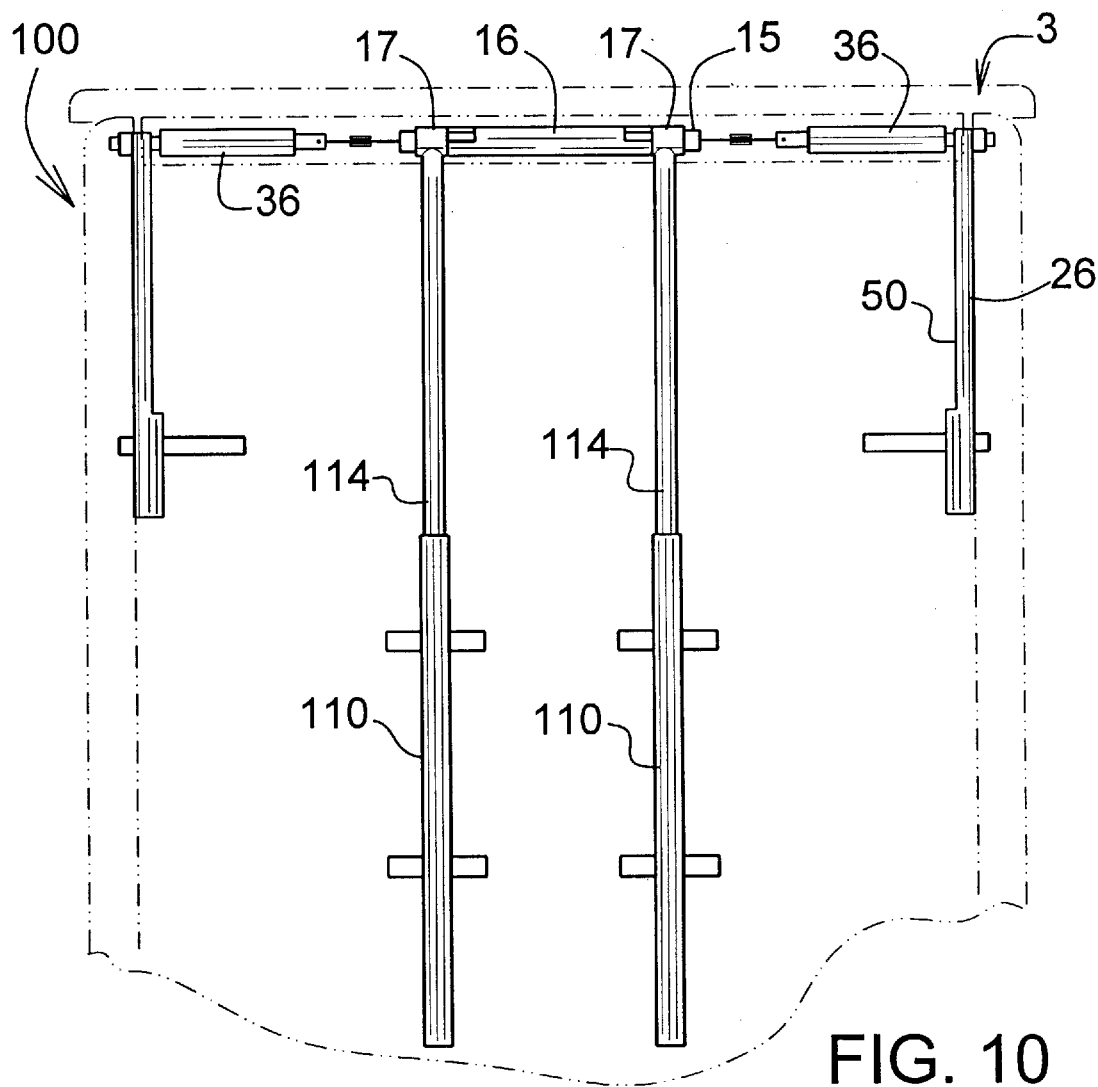
FIG. 10 is a bottom view of the of the pickup truck bed of the retractable tailgate assembly of FIG. 6 showing the tailgate in the raised vertical position and the truck frame and body in phantom lines.

As shown in FIGS. 1–2, a slidable longitudinal member 14 cooperatively engages a correspondingly shaped tubular member 10. A short support member 16 extends perpendicular from the distal end of the slidable longitudinal member 14. The cylindrical lateral member 16 is formed having a section cut out of the distal ends forming a groove or notch 21 and distal projecting portions 9. A pair of similarly sized and shaped tubular members 17 attached to the tailgate are disposed on each side of the lateral member 16. The tubular members 17 are also formed having a section cut out of the distal end forming a groove or notch 5 and distal projecting portion 7. The projections 9 of the longitudinal member 16 cooperatively engage the notch 5 of the tubular members 17, and the projecting portion 7 of the tubular member 17 engages the notch 21 of the lateral member 16 to limit the rotation between the lateral member 16 and tubular members 17 to about 90 degrees to hold the tailgate in the selected erect vertical position or horizontal lowered position for nesting beneath the pickup truck bed. Thus distal ends of the lateral member 16 and tubular members 17 are designed to limit the travel of the tailgate pivoting around the pivot points. Alternate means of limiting the travel of the tailgate may be utilized with the present invention such as pin and slot arrangement, or even chains attaching to the pickup truck bed and the tailgate. Moreover, the retractable tailgate 1 of the present invention may be utilized without a stop means as described heretofore, whereby the tailgate would simply slide all of the way up or down and be locked into either the upright or nested positions.

As illustrated in the FIGS. 1–4, 6–7, and 9–11, a lateral member 15 is pivotally disposed through the lateral member 16 and at least a portion of, and preferably thorough tubular members 17 extending outwardly past the short tubular support members or sleeves 17.

A pair of shorter longitudinal side support members 26 attach to the underside of the cargo bed by attachment members 28. A bracket 32 may be optionally employed for attachment to the cargo bed. Support members 26 include holes in the distal ends thereof for cooperative engagement with retractable holding means defining spring-loaded pins 34 slidable supported by a tubular member 36. A longitudinal interior section or portion of the members 26 are cutaway forming a channel 50 for receiving the tailgate edges which slide thereon in the retracted state. The pins 34 are usually spring loaded so that they must be pulled inwardly by a cable 38 directed by a pulley 39, 40 to a pair of rods 42 supported by a tailgate frame member and releasably held by a handle 44 which is nested in close proximity with the conventional tailgate release handle which works in a similar manner. Holes 60 in the members 26 cooperatively engage the pins 34 to hold the tailgate in the retracted position. The preferred embodiment includes a "U-shaped" guide member 46 attached to the interior of the tailgate and centrally positioned above the support frame and below the release handle to direct the cable extending from rods 42 toward the pulley 39.

As shown in FIGS. 6–10, an alternate embodiment 100 utilizes a pair of tubular members 110 having a pair of corresponding slidable longitudinal members 114.

Figure 11:
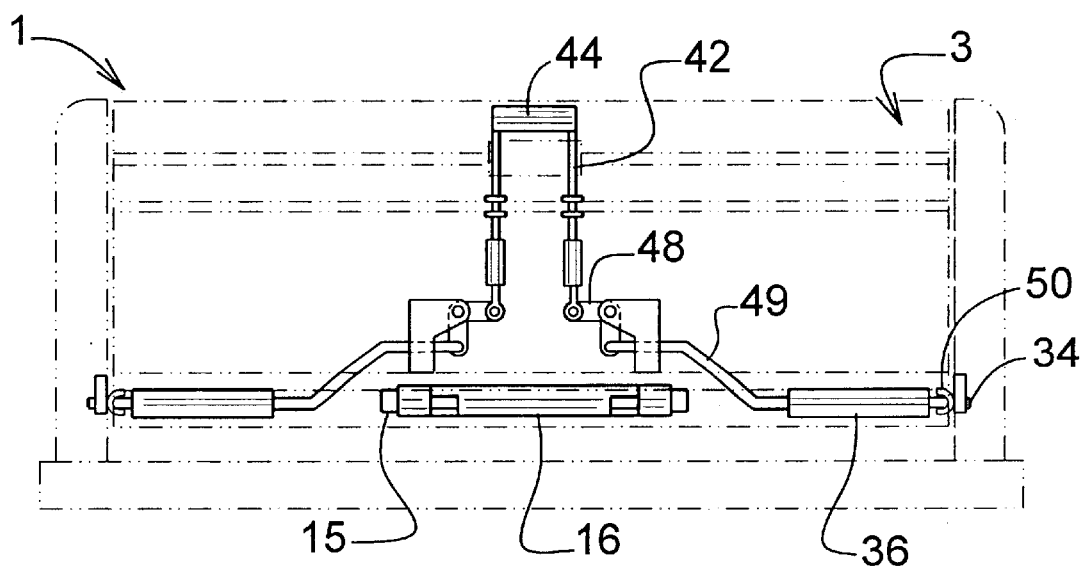
FIG. 11 is an end view of the tailgate release mechanism showing the use of a pair of "L-shaped" levers pivotally connecting to the lever and latch rods of the handle and pivot point receptacles of the bed as an alternate means of releasably engaging and disengaging the pins connecting to the pickup bed frame as opposed to the cables shown in FIGS. 3 and 9.

As shown in FIG. 11 the guide member 14 can be replaced by a pair of pivoting levers 48 forming doglegs which cooperate directly with the rods 42 extending downward from the handle 44 and a pair of release rods 49 extending through the tubular members 36 wherein the distal ends form pins for cooperative engagement with pivot pin recesses within the bed sidewall panels, thereby removing cables from the release system.

The retractable tailgate 1, 100 of the present invention does not require a complicated system of rails and rollers as usually employed by the prior art because the tailgate is supported internally by a frame attached to the underside of the cargo bed forming an integral retractable assembly. Although the retractable tailgate 1, 100 of the present invention is designed to be incorporated within the double wall panel of conventional tailgates it is contemplated that the mechanism could be attached to the surface of a tailgate and covered with a housing such as a sheet of metal or plastic as a retrofit system for modifying existing pickup truck tailgates.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

What is claimed is:

1. A retractable tailgate assembly, comprising:
    a cargo bed including a floor, a front wall panel connecting a pair of side walls panels;
    a tailgate comprising a panel defining an inner surface, a front surface, a rear outer surface, a top edge a bottom edge, side edges and means for cooperatively engaging said pair of side wall panels;
    a pair of longitudinal side support members attaching to a bottom surface of said cargo bed said longitudinal side support members including a channel formed therein;
    at least one tubular member attached to the bottom surface of said cargo bed;
    at least one slidable longitudinal member cooperatively engaging said at least one tubular member;
    a support member extending normal to a distal end of said slidable longitudinal member;
    means for holding extending from said tailgate for cooperatively engaging said support member;
    means for pivotally connecting said said support member in alignment with said means for holding extending from said tailgate;
    a release and locking mechanism comprising a retractable holding means supported within said support member for cooperatively engaging said pair of longitudinal side support members and including distal ends for sliding within said channel;
    means for biasing said retractable holding means in an extended locked position;
    means for releasing retractable holding means.

2. The retractable tailgate assembly of claim 1, wherein said tailgate comprises a panel defining an interior surface and an exterior surface spaced apart from one another.

3. The retractable tailgate assembly of claim 2, wherein the release and locking mechanism is nested inbetween the surfaces of the tailgate.

4. The retractable tailgate assembly of claim 1, said tailgate sliding beneath said cargo bed in a retracted position, said tailgate being outwardly extendable for interlocking with conventional pivot points of said cargo bed frame for pivoting and locking in an upright position.

5. The retractable tailgate assembly of claim 1, wherein said means for biasing said retractable holding means in an extended locked position comprises at least one spring loaded pin used to releasably engage said retractable holding means.

6. The retractable tailgate assembly of claim 1, wherein said means for releasing said retractable holding means comprises a handle and latch mechanism utilizing cables or levers to engage and disengage said means for biasing.

7. The retractable tailgate assembly of claim 1, including a pair of said tubular members attached to said bottom surface of said cargo bed and a corresponding slidable longitudinal member cooperatively engaging each of said tubular members.

8. The retractable tailgate assembly of claim 1, wherein said means for holding extending from said tailgate for cooperatively engaging said support member comprises at least one sleeve disposed on each side of said longitudinal member, each one of said sleeves having a portion cut out of a distal end forming a 90 degree notched portion and projection therearound.

9. The retractable tailgate assembly of claim 8, wherein said support member comprises a cylindrical longitudinal member having a portion cut out of each one of its distal ends forming a 90 degree notched portion and projection therearound.

10. The retractable tailgate-assembly of claim 9, including a longitudinal member disposed through said support member and said sleeve member, wherein said support member and said sleeve member are rotatively supported thereby, and said notched portion of said support member cooperatively engages the projection of said sleeve and the notched portion of said sleeve cooperatively engages the projection of said support member limiting rotation to about 90 degrees to hold the tailgate in a selected erect vertical position or horizontal lowered position for nesting beneath the truck.

11. The retractable tailgate assembly of claim 5, wherein said at least one spring loaded pin is pulled inwardly by a cable directed by a pulley to a pair of rods supported by a tailgate frame member and releasably held by a handle.

12. The retractable tailgate assembly of claim 5, including holes in the side edges for cooperatively engaging said at least on spring loaded pin for holding said tailgate in the retracted position.

13. The retractable tailgate assembly of claim 11, wherein a "U-shaped" guide member attaching to the inner surface of said tailgate is centrally positioned above the support member and below the release handle for directing the cable extending from rods toward the pulley.

14. The retractable tailgate assembly of claim 5, including a pair of pivoting levers forming doglegs which cooperate directly with rods extending downward from a handle and a pair of release rods extending through tubular members wherein distal ends form pins for cooperative engagement with pivot pin recesses with in the bed sidewall panels.

15. The retractable tailgate assembly of claim 1, said means for pivotally engaging said pair of side wall panels comprises a pair of opposing pins cooperatively engaging receptacles.

16. The retractable tailgate assembly of claim 1, wherein said release and locking mechanism is nested in between panels of a conventional tailgate.

17. The retractable tailgate assembly of claim 1, wherein said means for holding extending from said tailgate for cooperatively engaging said support member comprises a pair of sleeves spaced apart from one another for cooperatively engaging distal ends of said support member.

18. The retractable tailgate assembly of claim 1, wherein said means for pivotally connecting said said support member in alignment with said means for holding extending from said tailgate comprises a lateral member disposed within said means for holding extending from said tailgate and said support member.

19. A retractable tailgate assembly, comprising:
- a cargo bed including a floor, a front wall panel connecting a pair of side wall panels;
- a tailgate comprising a panel defining an inner surface front surface, a rear outer surface, a top edge, a bottom edge, and side edges and means for releasably engaging said pair of side wall panels;
- a pair of longitudinal side support members attaching to a bottom surface of said cargo bed said longitudinal side support members including a channel formed therein;
- at least one tubular member attached to the bottom surface of said cargo bed;
- at least one slidable longitudinal member cooperatively engaging said at least one tubular member;
- means for pivotally connecting said at least one slidable longitudinal member to said tailgate;
- means for slidably supporting said tailgate in said channels of said longitudinal side support members; and
- a release and locking mechanism for releasably locking said tailgate in a selected position within said channels.

20. The retractable tailgate assembly, of claim 19, wherein said means for pivotally connecting said at lease one slidable longitudinal member to said tailgate comprises
a first tubular support member extending normal to the distal end of said slidable longitudinal member, a pair of second tubular support members attaching to and extending from said tailgate, and a longitudinal member extending therethrough pivotally connecting said first tubular support member in alignment with said pair of second tubular support members.

21. The retractable tailgate assembly, of claim 19, wherein said means for slidably supporting said tailgate in said channel of said longitudinal side support members comprises retractable holding means extending from said tailgate.

22. The retractable tailgate assembly, of claim 21, wherein said retractable holding means defines a spring load pin.

23. The retractable tailgate assembly, of claim 21, wherein said release and locking mechanism for releasably locking said tailgate at a selected position within said channels comprises means for biasing said retractable holding means in an extended locked position cooperatively engaging at least one stop means disposed within each one of said channels.

24. The retractable tailgate assembly, of claim 23, wherein said at least one stop means defines at least one hole formed in each one of said channels.

25. The retractable tailgate assembly, of claim 23, wherein said release and locking mechanism for releasably locking said tailgate in a selected position within said channels includes a handle and latch mechanism utilizing cables or levers to engage and disengage said means for biasing.

* * * * *